US 8,624,905 B2

(12) United States Patent
Lee et al.

(10) Patent No.: US 8,624,905 B2
(45) Date of Patent: *Jan. 7, 2014

(54) DATA PROCESSING UNIT WITH MULTI-GRAPHIC CONTROLLER AND METHOD FOR PROCESSING DATA USING THE SAME

(75) Inventors: Jin-suk Lee, Seoul-si (KR); Yang-gi Kim, Seoul-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,805

(22) Filed: May 21, 2012

(65) Prior Publication Data

US 2012/0229479 A1     Sep. 13, 2012

Related U.S. Application Data

(63) Continuation of application No. 13/277,001, filed on Oct. 19, 2011, now Pat. No. 8,199,159, which is a continuation of application No. 12/142,504, filed on Jun. 19, 2008, now Pat. No. 8,072,459.

(30) Foreign Application Priority Data

Jan. 10, 2008   (KR) ........................ 10-2008-0003169

(51) Int. Cl.
G06F 15/16      (2006.01)
G06F 15/00      (2006.01)
G06T 1/00       (2006.01)

(52) U.S. Cl.
USPC .......................................... 345/502; 345/501

(58) Field of Classification Search
USPC .......................................... 345/502, 519, 501
See application file for complete search history.

(56) References Cited

U.S. PATENT DOCUMENTS

| | | |
|---|---|---|
| 6,760,031 B1 | 7/2004 | Langendorf et al. |
| 6,850,240 B1 | 2/2005 | Jones, Jr. |
| 7,075,541 B2 | 7/2006 | Diard |
| 7,466,316 B1 | 12/2008 | Alben et al. |
| 7,721,118 B1 | 5/2010 | Tamasi et al. |
| 2007/0195099 A1 | 8/2007 | Diard et al. |
| 2007/0283175 A1 | 12/2007 | Marinkovic et al. |
| 2007/0285428 A1 | 12/2007 | Foster et al. |
| 2008/0034238 A1 | 2/2008 | Hendry et al. |
| 2008/0117222 A1 | 5/2008 | Leroy et al. |
| 2008/0204460 A1 | 8/2008 | Marinkovic et al. |
| 2009/0096797 A1 | 4/2009 | Du et al. |

FOREIGN PATENT DOCUMENTS

| | | |
|---|---|---|
| CN | 1828479 A | 9/2006 |
| WO | WO 2007/140404 A2 | 12/2007 |

*Primary Examiner* — Jacinta M Crawford
(74) *Attorney, Agent, or Firm* — Birch, Stewart, Kolasch & Birch, LLP (57) ABSTRACT

A portable terminal that includes a first processing core configured to process data; a second processing core, which is faster than the first processing core, configured to process the data; and a storage unit configured to store multimedia data. The first and second processing cores are integrated into a single chipset, and are configured to be individually enabled or disabled based on a workload. The portable terminal is configured to be operated in one of a standby state and an operating state, to play back the multimedia data stored in the storage unit, and for Internet access.

11 Claims, 7 Drawing Sheets

DATA PROCESSING UNIT WITH MULTI-GRAPHIC CONTROLLER AND METHOD FOR PROCESSING DATA USING THE SAME

CROSS-REFERENCE TO RELATED APPLICATIONS

This application is a Continuation of application Ser. No. 13/277,001 filed on Oct. 19, 2011 now U.S. Pat. No. 8,199,159, which is a Continuation of application Ser. No. 12/142,504 filed on Jun. 19, 2008 (now U.S. Pat. No. 8,072,459), which claims priority to Application No. 10-2008-0003169 filed in the Republic of Korea on Jan. 10, 2008. The entire contents of all of the above applications are hereby incorporated by reference.

BACKGROUND OF THE INVENTION

1. Field of the Invention

The present invention relates to a data processing apparatus and method, and more specifically, to a data processing apparatus provided with a multi-graphic controller and a method of distributing data for processing data using the data processing apparatus.

2. Description of the Related Art

Recently, as computers and various terminals having a multimedia player function provide a function of displaying high-volume high-quality images, it is general that the computers and various terminals are provided with a plurality of graphic controllers to improve display quality and processing speed.

Particularly, in most cases, computers are provided with an internal graphic controller basically provided within a memory control hub (MCH), together with an external graphic controller separately provided outside of the MCH. In addition, graphic controllers having a multi-core are used in some cases.

When a plurality of graphic controllers are used as described above, the graphic controllers are selectively used in the prior art. However, since speed of processing image data may be increased by simultaneously operating a plurality of graphic controllers, it is further preferable to distribute image data among the plurality of graphic controllers and to simultaneously use the graphic controllers.

That is, the prior art is disadvantageous in that although a plurality of graphic controllers is provided, the graphic controllers are selectively used, and thus, the provided graphic controllers are not sufficiently utilized.

Furthermore, when a plurality of graphic controllers are simultaneously used, for all that speed of processing image data may be further increased only one graphic controller is selectively used. Thus, there is a problem in that the speed of processing image data is limited.

SUMMARY OF THE INVENTION

Accordingly, the present invention is conceived to solve the aforementioned problems in the prior art. An object of the present invention is to provide a data processing apparatus and method, wherein a plurality of graphic controllers can be simultaneously used.

Another object of the present invention is to provide a data processing apparatus and method, in which the efficiency of data processing can be enhanced by simultaneously using a plurality of graphic controllers and appropriately distributing image data.

A further object of the present invention is to provide a data processing apparatus and method, wherein the number and type of graphic controllers being operated are adaptively changed depending on a system state and the processing amount of data, thereby achieving the efficiency of data processing and prevention of power consumption.

According to an aspect of the present invention for achieving the objects, there is provided a data processing apparatus, which comprises a first graphic controller and a second graphic controller for processing and displaying inputted image data; and a control unit for distributing the image data in consideration of data processing capabilities of the first and second graphic controllers.

In addition, the first graphic controller may comprise a first memory unit for storing image data to be processed by the first graphic controller, and the second graphic controller may comprise a second memory unit for storing image data to be processed by the second graphic controller.

At this time, the control unit may transmit image data other than moving image data to the first graphic controller, and the moving image data may be transmitted to the second graphic controller.

Further, the control unit may transmit image data other than 3D data to the first graphic controller, and the 3D data may be transmitted to the second graphic controller.

Furthermore, the control unit may transmit image data created by the same application to the same graphic controller.

In addition, the control unit may transmit image data created by executing an application to a graphic controller predetermined among the first and second graphic controllers depending on a type of the application.

Further, the control unit may calculate speed of processing image data required in average when each application is executed, set a graphic controller, to which image data created by the corresponding application are to be transmitted, as the first graphic controller if the processing speed required in average is lower than a reference value, and set a graphic controller, to which image data created by the corresponding application are to be transmitted, as the second graphic controller if the processing speed required in average is higher than the reference value.

In addition, the control unit may distribute image data depending on the amount of data loaded on the first and second memory units.

Further, the control unit may distribute image data so that execution units of an application creating the image data processed by the first graphic controller do not exceed a predetermined number.

At this time, the control unit may differently count the execution unit depending on a type of an application in consideration of the required data processing amount of the application.

In addition, the control unit may adaptively change the number and type of graphic controllers being operated in consideration of at least one of the amount of image data to be processed and an operation state of a system.

In the meantime, according to the present invention, there is provided a data processing method in a data processing apparatus provided with a plurality of graphic controllers including a first graphic controller and a second graphic controller. The method comprises the steps of (A) generating a command for processing image data; (B) classifying the image data considering data processing capability of each graphic controller; and (C) transmitting the image data to each graphic controller as classified in step (B).

At this time, step (B) may comprise the steps of (B1) determining whether the image data correspond to moving image data; and (B2) classifying the image data as data to be transmitted to the first graphic controller if the image data are not moving image data and as data to be transmitted to the second graphic controller if the image data are moving image data.

Also, step (B) may comprise the steps of (B3) determining whether the image data correspond to 3D data; and (B4) classifying the image data as data to be transmitted to the first graphic controller if the image data are not 3D data and as data to be transmitted to the second graphic controller if the image data are 3D data.

Step (B) may comprise the steps of (B5) determining an application generating the image data; (B6) confirming a graphic controller previously determined to process the image data generated by the determined application; and (B7) transmitting the image data to the previously determined graphic controller.

Here, the method may further comprise the steps of (I) calculating an average image data processing speed when each application is executed; and (II) setting a graphic controller, to which the image data generated by the corresponding application are to be transmitted, as the first graphic controller if the processing speed of the application calculated in step (I) is lower than a reference value, and setting a graphic controller, to which the image data generated by the corresponding application are to be transmitted, as the second graphic controller if the processing speed of the application is higher than the reference value.

Also, step (B) may comprise the steps of (B8) confirming the amount of image data loaded on memory units, the memory units being provided in the plurality of graphic controllers and storing data to be processed by the graphic controllers, respectively; and (B9) classifying the image data depending on the amount of the image data loaded on the memory units, the amount of the image data being confirmed in step (B8).

In step (B), image data generated by the same application may be classified to be transmitted to the same graphic controller.

Also, step (B) may comprise the steps of (B10) calculating execution units of an application generating image data being processed for each graphic controller; and (B11) classifying the image data so that the execution units of the application in each graphic controller calculated in step (B10) does not exceed a number previously set for each graphic controller.

Here, the execution units may be counted depending on the number and type of applications being executed.

At this time, the method may further comprise the step of (D) adaptively changing the number or type of graphic controllers being operated considering at least one of the amount of image data to be processed and an operating state of a system.

In addition, when a graphic controller having been operated is changed into a non-operation state to adaptively change the number or type of graphic controllers being operated, the step (D) may comprise the steps of (D1) transmitting image data having been transmitted to the graphic controller having been operated to another graphic controller; and (D2) reducing or blocking power supplied to the graphic controller having been operated after completely processing image data temporarily stored in a memory unit that stores image data to be processed by the graphic controller having been operated.

According to a data processing apparatus of a computer and a data processing method using the same according to the present invention as described above in detail, the following effects can be expected.

That is, there is provided a data processing apparatus and method, in which a plurality of graphic controllers can be simultaneously used, so that there is an advantage in that data processing speed can be improved.

Furthermore, according to a data processing apparatus of a computer and a data processing method using the same of the present invention, since a plurality of graphic controllers are simultaneously used and image data are appropriately distributed, there is an advantage in that the efficiency of data processing can be enhanced.

In addition, according to a data processing apparatus of a computer and a data processing method using the same of the present invention, since the number and type of graphic controllers being operated are adaptively changed depending on a system state and the processing amount of data, there is an advantage in that the efficiency of data processing and prevention of power consumption can be achieved at the same time.

DESCRIPTION OF THE PREFERRED EMBODIMENTS

Hereinafter, embodiments of a data processing apparatus and method according to the present invention will be described in detail with reference to the accompanying drawings.

Figure 1:
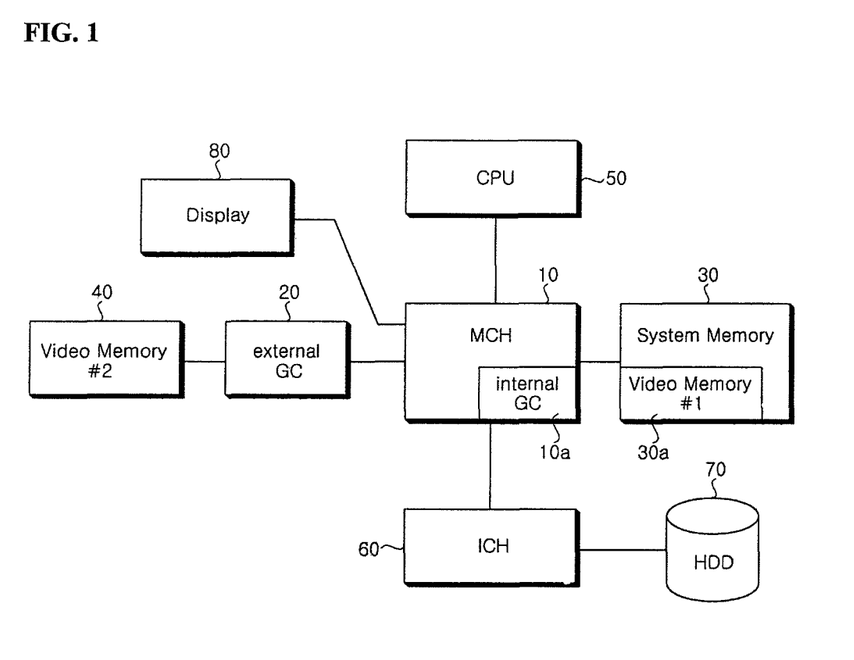
FIG. 1 is a block diagram showing the configuration of a data processing apparatus according to a specific embodiment of the present invention.

FIG. 1 is a block diagram showing the configuration of a data processing apparatus according to a specific embodiment of the present invention.

At this time, the data processing apparatus includes a variety of terminals provided with a processing unit for processing data, as well as computers.

As shown in FIG. 1, the data processing apparatus according to the specific embodiment of the present invention may be provided with a memory control hub (MCH) 10. The MCH 10, which is a chipset generally provided in a computer, functions as a passageway of data and connects various memories and graphic devices to control them.

The MCH 10 generally includes an internal graphic controller 10a (hereinafter, referred to as a first graphic controller).

The first graphic controller 10a processes image data and displays the image data on an image display apparatus such as a monitor.

At this time, although the first graphic controller 10a may be provided within the MCH 10 as shown in the figure, it can be provided as a configuration separated from the MCH 10. When the MCH 10 is not provided, the first graphic controller may be provided as an independent single chipset.

Further, in the present invention, an external graphic controller 20 (hereinafter, referred to as a second graphic controller) is provided in addition to the first graphic controller 10a.

The second graphic controller 20 is connected to the MCH 10 and receives data and control through the MCH. The second graphic controller 20 processes received image data to display them on an image display apparatus such as a monitor.

Although the configuration provided with the two graphic controllers including the first and second graphic controllers 10a and 20 is shown in FIG. 1, a plurality of graphic controllers more than those may be configured in the data processing apparatus.

Figure 7:
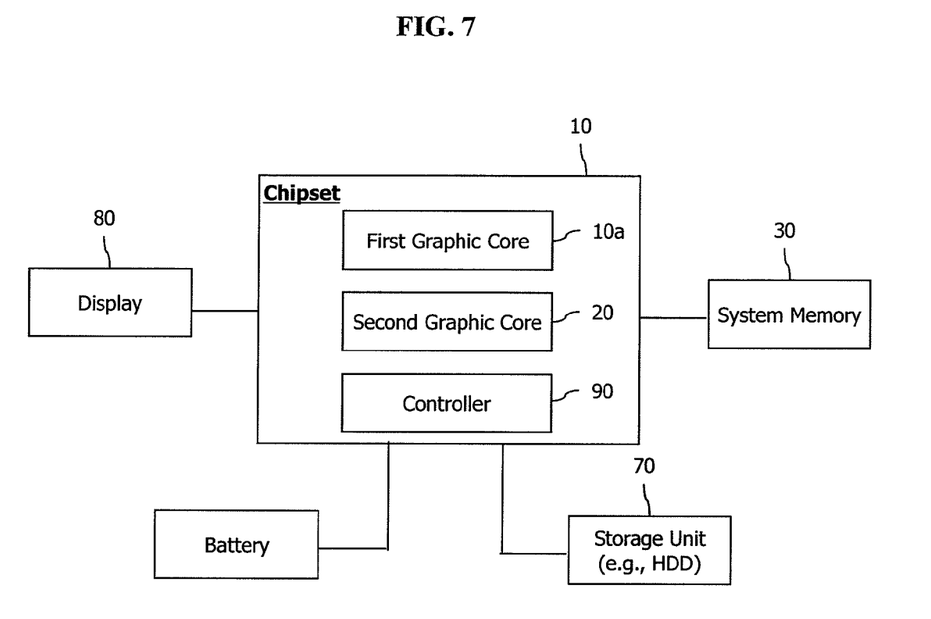
FIG. 7 is a block diagram showing the configuration of a data processing apparatus according to a specific embodiment of the present invention.

Alternatively, even in a case where only a single graphic controller is configured, it may be configured as a multi-core graphic controller. In this case, as seen in FIG. 7, the first and second graphic controllers 10a and 20, which will be described later, are designated as cores integrated in the multi-core graphic controller along with a controller 90 that processes data other than graphics.

In the meantime, the data processing apparatus may be provided with a system memory 30. The system memory 30 is the main memory of the data processing apparatus and generally comprises a random access memory (RAM).

In addition, a video memory 30a (hereinafter, referred to as a first memory unit) for storing data, which includes image data to be processed by the first graphic controller 10a, may be provided at a portion of a storage area of the system memory 30.

At this time, the first memory unit 30a may be provided in the system memory 30 as described above or provided as a separate storage device.

In addition, a video memory 40 (hereinafter, referred to as a second memory unit) may be also provided in the second graphic controller 20.

The second memory unit 40 stores data including image data to be processed by the second graphic controller 20. At this time, the second memory unit 40 may be provided as a variety of storage devices, and particularly, comprises a RAM.

In the meantime, the data processing apparatus according to the specific embodiment of the present invention is provided with a central processing unit (CPU) 50. The CPU 50 is a core device, which controls the operation of the overall system of the data processing apparatus and executes operation of a program, and may comprise a control device and an arithmetic device.

Image data generated by a variety of programs and applications executed by the CPU 50 are transmitted to and processed by the first and second graphic controllers 10a and 20.

The data processing apparatus may be provided with an input/output control hub (ICH) 60. The ICH 60 is connected with a hard disk drive (HDD) 70 and a flash memory for storing a variety of data and various hardware units, and controls them.

Here, the HDD 70 stores various kinds of programs and applications executed by the CPU 50, as well as a variety of documents, multimedia data, and the like created, updated, displayed, or played back by the programs or applications.

Then, the CPU 50 loads such data from the HDD 70 onto the RAM 30 and processes the loaded data, creates image data to be displayed to users as a result of the process, and transmits the image data to the first or second graphic controller 10a or 20.

At this time, the image data transmitted to the first and second graphic controllers 10a and 20 may be respectively stored in the first and second memory units 30a and 40.

Here, the CPU 50 or the MCH 10 may adaptively control the number or type of controllers being operated among the first and second graphic controllers 10a and 20 in consideration of a system state and the amount of image data to be processed.

Generally, the first graphic controller 10a basically configured within the system may be less capable in processing data than the second graphic controller 20 configured as a separated module outside of the system.

Accordingly, the CPU 50 or the MCH 10 may operate only the first graphic controller 10a when the amount of image data to be processed is small, and change the data processing means to the second graphic controller 20 when the processing amount of image data increases.

In addition, when the processing amount of image data is too large to be processed only by the second graphic controller 20, the first and second graphic controllers 10a and 20 may be simultaneously operated to enhance system performance, and thus, the speed of processing image data can be improved.

Then, when adaptively changing the number and type of graphic controllers being operated as described above, the CPU 50 or the MCH 10 may prevent power consumption by blocking or reducing the power supplied to a graphic controller that is not operating.

At this time, the aforementioned descriptions are merely an example, and when adaptively changing the number and type of graphic controllers being operated, the CPU 50 or the MCH 10 may diversely change the number or type of the graphic controllers being operated in consideration of the data processing capability of each graphic controller.

A separate program or the operating system including a variety of settings and logics needed for the CPU 50 or the MCH 10 to change the number and type of graphic controllers being operated may be stored in a memory device or storage device such as the system memory 30, the HDD 70, or the like of the data processing apparatus.

The criteria for changing the number and type of graphic controllers by the CPU 50 or the MCH 10 may be a system state or the amount of image data to be processed as described above.

At this time, the system state may be whether the remaining amount of a battery is decreased below a predetermined amount, whether AC power is supplied, or the like when the data processing apparatus is a portable apparatus. Here, if the remaining amount of a battery is decreased below a predetermined amount, it may be controlled to operate only the graphic controller that has consumed the least power in order to prevent power consumption of the battery.

In addition, the amount of image data to be processed may be calculated by measuring the number of bits or the like of the data or may be known by required speed of processing the image data, the amount of image data stored in the first or second memory unit 30a or 40, or the like.

Further, the amount of image data to be processed may not be specifically calculated as described above, but may be determined by the number and type of applications being executed.

That is, there may be an embodiment, in which if the number of applications being executed is larger than a predetermined number or the application being executed is a moving picture playback program, the first and second graphic controllers 10a and 20 are simultaneously operated.

However, such an embodiment is merely one of various embodiments, and the number and type of a plurality of graphic controllers may be adaptively changed based on a variety of criteria to thereby process the image data.

In the meantime, when the system state is changed from a state of operating only the first graphic controller 10a to a state of operating only the second graphic controller 20, the CPU 50 or the MCH 10 transmits image data having been transmitted to the first graphic controller 10a to the second graphic controller 20.

At this time, the CPU 50 or the MCH 10 does not block or reduce driving power having been supplied to the first graphic controller 10a until the data stored in the first memory unit 30a, which is waiting to be processed by the first graphic controller 10a, is completely processed by the first graphic controller 10a.

Then, before the CPU 50 or the MCH 10 transmits image data to the second graphic controller 20, the image data transmitted to and stored in the first memory unit 30a is completely processed by the first graphic controller 10a, and then, the CPU 50 or the MCH 10 blocks or reduces the power supplied to the first graphic controller 10a.

In addition, when the use amount of the second memory unit 40 increases more than a predetermined amount or the instantaneous variation amount of data stored in the second memory unit 40 is more than a predetermined amount while only the second graphic controller 20 is operating and thus the system state should be changed to a mode for simultaneously driving the first and second graphic controllers 10a and 20 (dual mode), the CPU 50 or the MCH 10 resumes supplying the driving power to the first graphic controller 10a.

Therefore, the operation of the first graphic controller 10a is resumed, and image data are appropriately distributed and transmitted to the first and second graphic controllers 10a and 20. Accordingly, the image data to be processed are divided and processed by the first and second graphic controllers 10a and 20.

In addition, when the amount of data to be processed in the dual mode decreases and thus the system state is changed to drive only the second graphic controller 20, the image data that have been divided and transmitted to the first and second graphic controllers 10a and 20 are transmitted only to the second graphic controller 20.

Then, if the first graphic controller 10a completely processes the image data stored in the first memory unit 30a, the driving power having been supplied to the first graphic controller 10a is then reduced to put the first graphic controller into a standby state or blocked to put the system into a state in which only the second graphic controller 20 processes data.

In addition, when the use amount of the second memory unit 40 decreases less than a predetermined amount or the data processing amount required per unit time decreases less than a predetermined amount while only the second graphic controller 20 is operating and thus the system state is changed to a state of operating only the first graphic controller 10a, the CPU 50 or the MCH 10 blocks or reduces the power having been supplied to the second graphic controller 20 only after the data stored in the second memory unit 40 is completely processed by the second graphic controller 20.

At this time, the control of the power supplied to the first or second graphic controller 10a or 20 may be effected by an interface through which the first or second graphic controller 10a or 20 is connected to the MCH 10.

Generally, the interface may be PCI-Express (hereinafter, referred to as PCI-E). The PCI-E defines Link power management states.

The Link power management states are based on Active State Power Management (ASPM), which is a power management standard for a Link between a chipset and a device connected through the PCI-E interface.

According to the ASPM, power management states may be divided into L0 L0s, L1, L2, and L3 states, and a system may enter L0, L0s, and L1 states while operating.

Briefly describing the states, first, the L0 state represents a normal operation state. Transmission and reception of all kinds of signals and other operations are allowed.

The L0s state is a low resume latency, energy saving standby state. In the L0s state, the main power supply, and the reference clock and internal phase lock loop (PLL) of components are all activated at all times.

In addition, the physical layer of the PCI-E provides a mechanism for rapidly entering the L0 state from the L0s state.

In the meantime, the L1 state is a Higher latency, lower power standby state. In the L1 state, all platform provided main power supplies and component reference clocks must remain active at all times. However, the internal PLL of the components are blocked in the L1 state. Accordingly, a further greater power saving effect is obtained.

In addition, it usually takes some micro seconds to return to the L0 state from the L1 state.

Meanwhile, the L2 state is an Auxiliary powered Link deep energy saving state. In the L2 state, the main power and reference clock supplied to the components are blocked. The logic for reactivating the Link depends on the auxiliary power supply in the L2 state.

Finally, the L3 state is a Link Off state, and at this time, the supply of all power is blocked.

Accordingly, when the first or second graphic controller 10a or 20 is connected to the MCH 10 or other control devices through the PCI-E, the Link power management state is controlled to be in the L0 state in order to normally operate the first or second graphic controller 10a or 20.

When any one of the first and second graphic controllers 10a and 20 is operated, the other Link is controlled to be in any one of the states L0s, L1, L2, and L3. However, since it should be easy to return to the L0 state in order to easily control adaptive operation of the graphic controllers, it is desirable to transit the Link power management state to the L0s or L1 state.

Meanwhile, in a state where both of the first and second graphic controllers 10a and 20 operate (in a dual mode), image data created by applications and programs executed by the CPU 50 are appropriately distributed among the first and second graphic controllers 10a and 20 and thus are simultaneously processed in the two graphic controllers.

At this time, the distribution of image data as described above may be performed by the CPU 50 or the MCH 10. Also, an additional controller may be separately provided to thereby distribute image data among the first and second graphic controllers 10a and 20.

Hereinafter, it will be described below that only the CPU 50 performs such a function.

In distributing created image data, the CPU 50 classifies the image data based on a variety of criteria and transmits the image data to the first and second graphic controllers 10a and 20. The criteria are determined considering difference in performance between the first and second graphic controllers 10a and 20.

That is, as already described above, a separately provided external graphic controller is generally superior in performance to that of an internal graphic controller basically configured within a chipset of a computer, and a plurality of graphic controllers may be different in data processing capability. Accordingly, considering the difference, a variety of criteria are proposed to transmit further more data to a graphic controller having superior performance.

First, the CPU 50 classifies the image data into moving image data and other data and transmits the moving image data to one having the better data processing capability among the first and second graphic controllers 10a and 20.

At this time, assuming that the second graphic controller 20 processes data faster than the first graphic controller 10a, the embodiments will be described. However, it can be changed depending on the type, usage, and design of the data processing apparatus, and the first and second graphic controllers 10a and 20 may be configured to have the same capability.

Here, the moving image data will be processed by the second graphic controller 20, and the other data except the moving image data will be processed by the first graphic controller 10a.

In the meantime, the CPU 50 classifies the image data into 3-dimensional (3D) data and the other data and then transmits the 3D data to the second graphic controller 20 and the other data except the 3D data to the first graphic controller 10a.

In addition, as another criterion, when image data created by an application is transmitted to the same graphic controller, it is previously determined which of the first and second graphic controllers 10a and 20 each application transmits image data to, and image data can be classified and transmitted depending on the previous determination.

For example, which of the graphic controllers the image data will be processed through can be previously set for every application so that an application related to documentation transmits the image data to the first graphic controller 10a and an application related to playback of moving pictures transmits the image data to the second graphic controller 20.

Alternatively, an average speed of processing image data is calculated when every application is executed in the CPU 50 of the data processing apparatus, so that the image data created by an application whose processing speed is higher than a reference value may be automatically set to be transmitted to the second graphic controller 20 and the image data created by an application whose processing speed is lower than the reference value may be automatically set to be transmitted to the first graphic controller 10a.

That is, when executing each application, the CPU 50 calculates and stores the data processing amount per unit time by dividing the data processing amount of all driven graphic controllers for image data created by the execution of the corresponding application by the entire execution time of the corresponding application.

Then, the data processing amount per unit time is accumulated and averaged whenever the corresponding application is executed, thereby obtaining information on an average image data processing speed for every application when the application is executed.

Then, using such information, the average image data processing speed of a specific application is compared with the reference value and which of the graphic controllers will process image data is determined.

In addition, the CPU 50 or the MCH 10 may classify image data by limiting the number of applications that create the image data processed by the first or second graphic controller 10a or 20.

For example, the first graphic controller 10a may be set to simultaneously process image data for only five applications. In this case, image data created by applications other than the five applications may be transmitted to the second graphic controller 20.

As an example, when the operating system executes two identical documentation programs, three Internet browsers, and one moving picture playback program through windows, the image data created by the two documentation programs and three Internet browsers are transmitted to the first graphic controller 10a, and the image data created by the moving picture playback program is transmitted to the second graphic controller 20, so that the number of applications creating the image data processed by the first graphic controller 10a can be limited.

At this time, since the amount of image data to be processed by each application is different from others, execution units of each application may be re-set.

For example, if one documentation program is executed, it is considered as one execution unit. At this time, since an Internet browser processes more image data compared with a documentation program, one Internet browser may be considered as two execution units. On the same account, a moving picture playback program may be previously set as four execution units.

In this case, in the example described above, two execution units of the documentation program, six execution units of the Internet browser, and four execution units of the moving picture playback program are simultaneously executed.

At this time, if the number of application execution units that can be simultaneously processed by the first graphic controller 10a is set to five, the CPU 50 or the MCH 10 may distribute image data to the first graphic controller 10a by combining one execution unit of the documentation program with four execution units of the Internet browser, one execution unit of the documentation program with four execution units of the moving picture playback program, or the like based on the setting.

When three or more graphic controllers are provided unlike the example described above, execution units of an application that can be simultaneously processed by each graphic controller may be previously set to distribute image data based the setting.

In addition, the CPU 50 or the MCH 10 may detect the amount of image data loaded on the first or second memory unit 30a or 40 and distribute the image data based on the amount of the loaded image data.

The first and second memory units 30a and 40 store the image data to be processed by the first and second graphic controllers 10a and 20, respectively. The image data stored in the first and second memory units 30a and 40 are processed by the first and second graphic controllers 10a and 20, respectively, and deleted after being processed. The image data distributed by the CPU 50 or the MCH 10 are stored again in the first and second memory units 30a and 40, and these processes are repeated.

Accordingly, the CPU 50 or the MCH 10 may detect the amount of the image data respectively stored in the first and second memory units 30*a* and 40 and distribute the image data to a memory unit loaded with a smaller amount of image data.

Other than these, the CPU 50 or the MCH 10 appropriately distributes image data among a plurality of graphic controllers considering characteristics and processing capabilities of graphic controllers and characteristics of image data or applications.

In addition, when a plurality of applications are executed in the data processing apparatus, the CPU 50 or the MCH 10 calculates the amount of image data created by each application per unit time. The image data created by an application that creates a large amount image data are transmitted to the second graphic controller 20, while the image data created by an application that creates a relatively small amount of image data to the first graphic controller 10*a*. At this time, a large or small amount of image data created per unit time may be determined relatively or based on a predetermined value.

Also, the image data distributed to the first and second graphic controllers 10*a* and 20 as described above are respectively processed by the first and second graphic controllers 10*a* and 20 and outputted on the display 80.

Hereinafter, a data processing method according to the specific embodiment of the present invention will be described in detail with reference to FIGS. 2 to 6.

Figure 2:
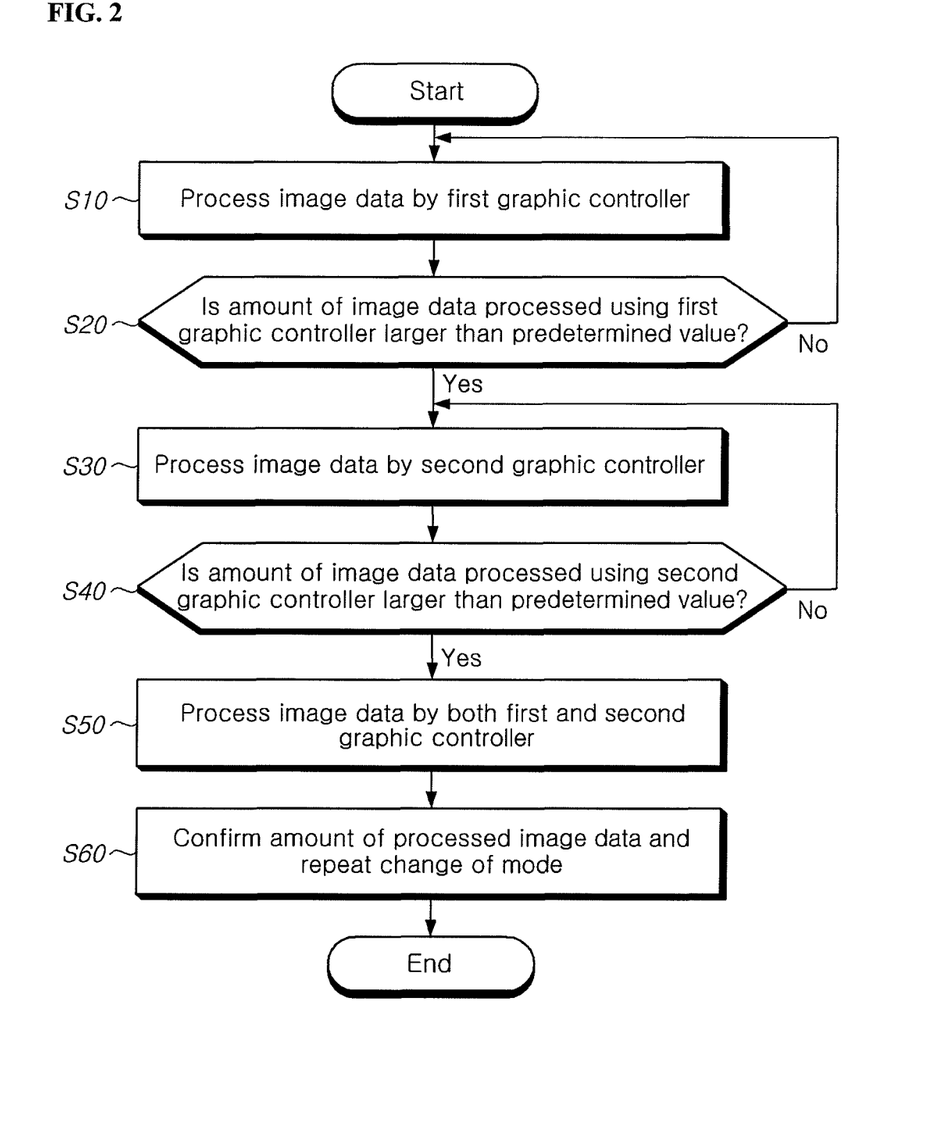
FIG. 2 is a flowchart illustrating an adaptive graphic data processing method using the data processing apparatus provided with a plurality of graphic controllers.
Figure 3:
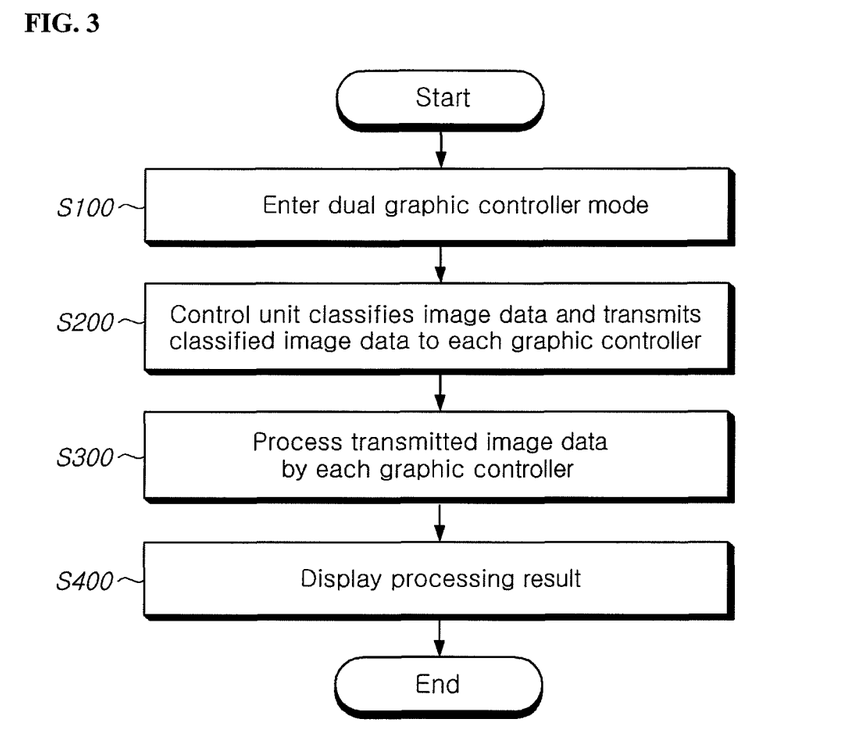
FIG. 3 is a flowchart stepwise illustrating a data processing method according to the specific embodiment of the present invention.
Figure 4:
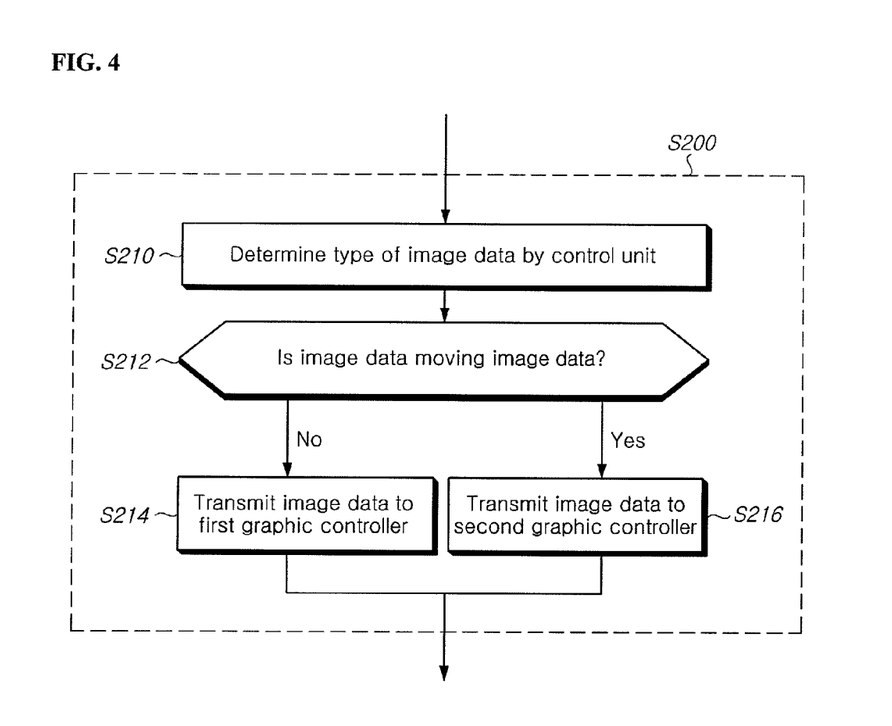
FIG. 4 is a flowchart stepwise illustrating a data processing method according to a first embodiment of the present invention in steps.
Figure 5:
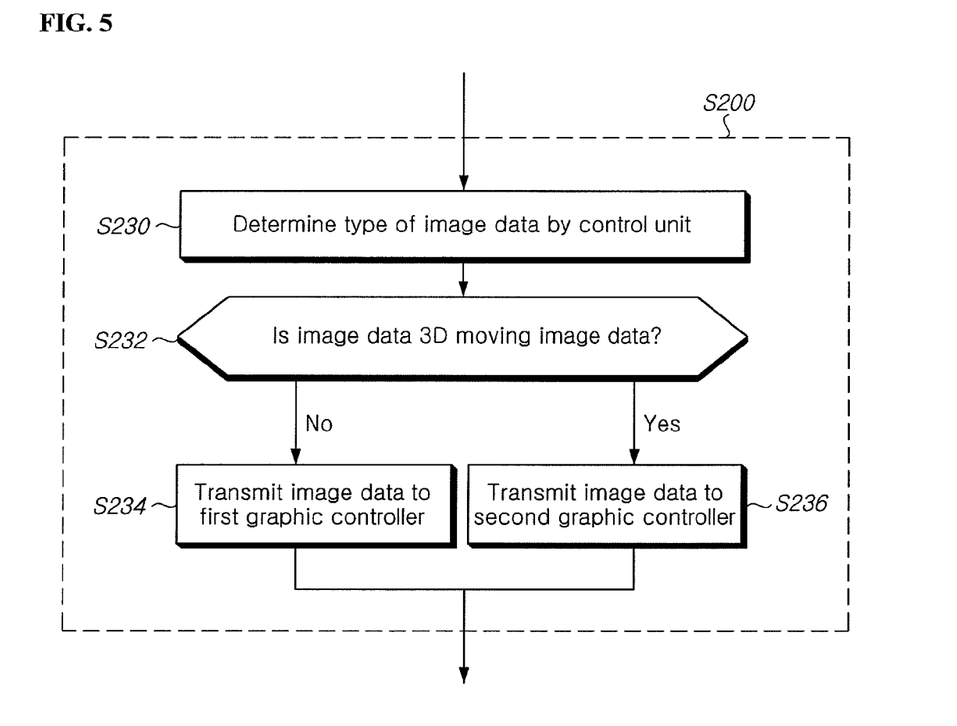
FIG. 5 is a flowchart stepwise illustrating a data processing method according to a second embodiment of the present invention in steps.
Figure 6:
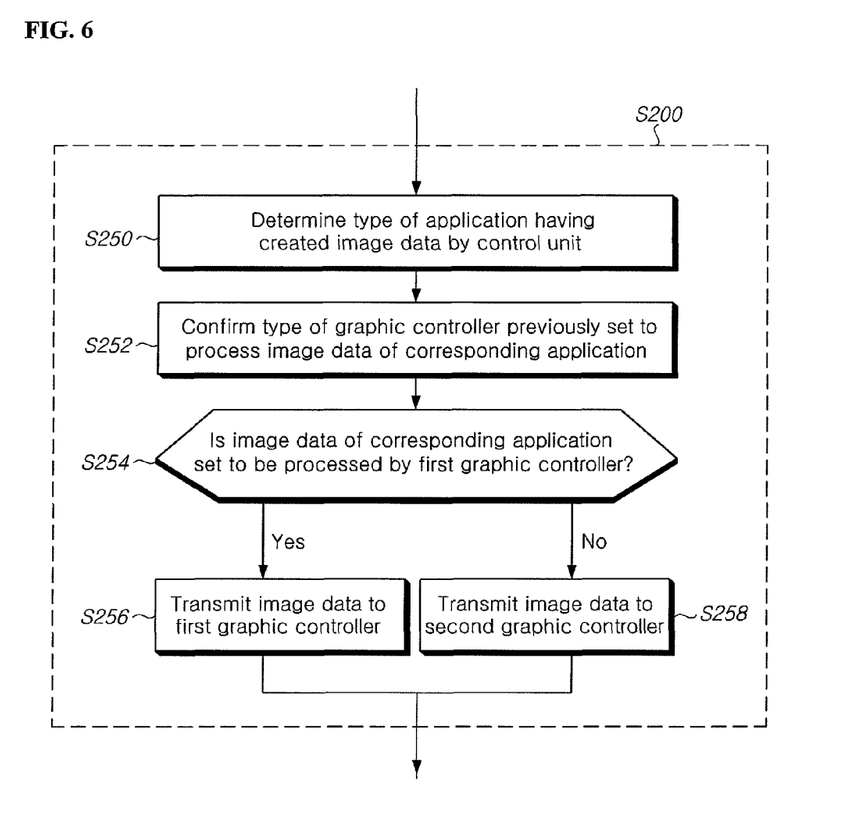
FIG. 6 is a flowchart stepwise illustrating a data processing method according to a third embodiment of the present invention in steps.

FIG. 2 is a flowchart illustrating an adaptive graphic data processing method using the data processing apparatus provided with a plurality of graphic controllers. FIG. 3 is a flowchart stepwise illustrating a data processing method according to the specific embodiment of the present invention. FIG. 4 is a flowchart stepwise illustrating a data processing method according to a first embodiment of the present invention in steps. FIG. 5 is a flowchart stepwise illustrating a data processing method according to a second embodiment of the present invention in steps. FIG. 6 is a flowchart stepwise illustrating a data processing method according to a third embodiment of the present invention in steps.

Prior to the description of the data processing method according to the specific embodiment of the present invention, a method of adaptively changing the number and type of graphic controllers being operated in consideration of a system state and the processing amount of image data in a terminal provided with a plurality of graphic controllers such as the data processing apparatus according to the present invention will be described first.

As shown in FIG. 2, in the data processing apparatus provided with a plurality of graphic controllers, the first graphic controller 10*a* preferentially processes image data (step S10).

However, if the amount of the image data processed by the first graphic controller 10*a* per unit time is larger than a predetermined value (step S20), the image data are transmitted to be processed by the second graphic controller 20 (step S30).

If the amount of the image data processed by the first graphic controller 10*a* is smaller than a predetermined value, the image data are processed by the first graphic controller 10*a*.

In the meantime, even while the image data are processed by the second graphic controller in step S30, it is continuously monitored whether the amount of the image data processed by the second graphic controller per unit time is larger than a predetermined value (step S40).

At this time, the predetermined value in step S40 is larger than the predetermined value in step S20. However, it is assumed that the performance of the second graphic controller 20 is higher than that of the first graphic controller 10*a*.

In the meantime, if the amount of the image data processed by the second graphic controller per unit time is larger than the predetermined value in step S40, both of the first and second graphic controllers 10*a* and 20 are used in processing the image data (step S50).

Then, through the operation of continuously monitoring the amount of the image data processed by the graphic controllers being operated per unit time, the amount of the image data processed per unit time is compared with a predetermined value and the number and type of graphic controllers being operated is changed repeatedly.

At this time, a case where both the first and second graphic controllers 10*a* and 20 are simultaneously operated in step S50 will be described as a dual mode hereinafter.

As shown in FIG. 3, the data processing method according to the specific embodiment of the present invention starts from the step of entering the dual mode in which the first and second graphic controllers 10*a* and 20 simultaneously operate (step S100).

Then, if entering the dual mode in step S100, the step of classifying image data into image data for the first graphic controller 10 and image data for the second graphic controller 20 and transmitting the classified image data is performed (step S200).

At this time, although a variety of criteria may be applied to classify the image data, considering data processing capabilities of the first and second graphic controllers 10*a* and 20 preferentially, the image data may be classified so that a large amount of image data is distributed to a graphic controller having further superior data processing capability.

Detailed criteria for classifying image data will be described later with reference to FIGS. 4 to 6.

Then, the first and second graphic controllers 10*a* and 20 receiving the image data classified and transmitted in step S200 respectively process the image data (step S300) and output processing results on the display 80.

In the meantime, step S200 of the data processing method may be accomplished in a variety of ways.

As shown in FIG. 4, step S200 first starts from the step of determining the type of image data by the CPU 50 or the MCH 10 (step S210).

If the image data is determined to be moving image data in step S210 (step S212), the image data are transmitted to the second graphic controller 20 (step S216).

However, if the image data is determined not to be moving image data as a result of the determination in step S210, the CPU 50 or the MCH 10 transmits the image data to the first graphic controller 10*a* (step S214).

Then, as shown in FIG. 5, step S200 starts from the step of determining the type of image data by the CPU 50 or the MCH 10 (step S230).

If the image data is determined to be 3D data in step S230 (step S232), the CPU 50 or the MCH 10 transmits the image data to the second graphic controller 20 (step S236).

However, if the image data is determined not to be 3D data in step S230 (step S232), the CPU 50 or the MCH 10 transmits the image data to the first graphic controller 10*a* (step S234).

In addition, as shown in FIG. 6, step S200 of the data processing method according to the specific embodiment of the present invention starts from the step of determining the type of an application that creates image data by the CPU 50 or the MCH 10 (step S250).

Then, the step of confirming a graphic controller that is previously set to process the image data created by the application determined in step S250 is performed (step S252).

If the graphic controller previously set to process the image data of the corresponding application is the first graphic controller as a result of the confirmation in step S252 (step S254), the CPU 50 or the MCH 10 transmits the image data to the first graphic controller 10*a* (step S256).

On the other hand, if the graphic controller previously set to process the image data of a corresponding application is not the first graphic controller (step S254), the CPU 50 or the MCH 10 transmits the image data to the second graphic controller 20 (step S258).

For example, when the image data is created by a documentation program, the image data is determined to have been created by the documentation program in step S250, and it is confirmed that the data created by the documentation program is set to be processed by the first graphic controller 10*a* in step S252. Then, step S200 is completed by transmitting the image data to the first graphic controller 10*a*.

Other than these, as described above, step S200 of the data processing method may be configured so that after detecting the amount of image data loaded at least one of the first and second memory units 30*a* and 40, the image data are not transmitted to a graphic controller in which the amount of the image data is larger than a reference value, so that after calculating ratios of the amounts of currently loaded image data to storage capacities of the first and second memory units 30*a* and 40, the image data are transmitted to a graphic controller in which the ratio is lower.

The scope of the present invention is not limited to the embodiments described above but is defined by the appended claims. It will be apparent that those skilled in the art can make various modifications and changes thereto within the scope of the invention defined by the claims.

What is claimed is:

1. A portable terminal, comprising:
    a controller;
    a first graphical processing core configured to process data;
    a second graphical processing core, which is faster than the first graphical processing core, configured to process the data,
    wherein the first and second graphical processing cores are integrated into a single chipset,
    wherein the portable terminal is configured to be operated in a standby state or an operating state, and
    wherein the first and second graphical processing cores are configured to be individually enabled or disabled based on a workload in the operating state; and
    a storage unit configured to store multimedia data,
    wherein the portable terminal is configured to play back the multimedia data stored in the storage unit,
    wherein the portable terminal is configured for Internet access,
    wherein the controller is configured to:
        calculate an average speed for processing an executable application program,
        assign image data generated by the executable application program to the first graphical processing core if the average speed is lower than a first reference value, and
        assign the image data generated by the executable application program to the second graphical processing core if the average speed is above the first reference value; and
    wherein the controller is further configured to:
        calculate an amount of the image data generated by the executable application program,
        assign the image data to the first graphical processing core if the amount of image data is lower than a second reference value, and
        assign the image data to the second graphical processing core if the amount of image data is above the second reference value.

2. The portable terminal of claim 1, wherein the data includes first and second images.

3. The portable terminal of claim 2, wherein the first and second images are the same image.

4. The portable terminal of claim 2, wherein the first and second images are not the same image.

5. The portable terminal of claim 1, further comprising:
    a battery configured to supply power to the first and second graphical processing cores.

6. The portable terminal of claim 1, further comprising:
    a first memory associated with the first graphical processing core; and
    a second memory associated with the second graphical processing core,
    wherein the first memory and the second memory are configured to exchange data if a mode of the portable terminal is changed.

7. The portable terminal of claim 1, wherein in the standby state, power is not supplied to at least one of the first and second graphical processing cores.

8. A single chipset for a portable terminal, the single chipset comprising:
    a controller;
    a first graphical processing core configured to process data; and
    a second graphical processing core, which is faster than the first graphical processing core, configured to process the data,
    wherein the first and second graphical processing cores are integrated into the single chipset,
    wherein the portable terminal is configured to be operated in a standby state or an operating state,
    wherein the first and second graphical processing cores are configured to be individually enabled or disabled based on a workload in the operating state,
    wherein the single chipset is configured to enable the portable terminal to play back multimedia data and to perform Internet access,
    wherein the controller is configured to:
        calculate an average speed for processing an executable application program,
        assign image data generated by the executable application program to the first graphical processing core if the average speed is lower than a first reference value, and
        assign the image data generated by the executable application program to the second graphical processing core if the average speed is above the first reference value, and
    wherein the controller is further configured to:
        calculate an amount of the image data generated by the executable application program,
        assign the image data to the first graphical processing core if the amount of data is lower than a second reference value, and
        assign the image data to the second graphical processing core if the amount of data is above the second reference value.

9. The single chipset of claim 8,
    wherein the data includes first and second images, and
    wherein the first and second images are not the same image.

10. The single chipset of claim 8, further comprising:
a third graphical processing core configured to process a still image.

11. The single chipset of claim 8, wherein the single chipset is configured to receive power from a battery.

* * * * *